July 30, 1957  H. L. JOHNSON  2,800,838
TRACER GUIDE

Filed June 11, 1954  2 Sheets-Sheet 1

INVENTOR:
HARRY L. JOHNSON
BY George Sipkin
Lee J. Huntzberger
ATTORNEYS

July 30, 1957  H. L. JOHNSON  2,800,838
TRACER GUIDE

Filed June 11, 1954  2 Sheets-Sheet 2

INVENTOR:
HARRY L. JOHNSON
BY George Lipkin
Lee J. Huntzberger
ATTORNEYS

United States Patent Office 2,800,838
Patented July 30, 1957

2,800,838

TRACER GUIDE

Harry L. Johnson, Gloucester, Mass.

Application June 11, 1954, Serial No. 436,265

3 Claims. (Cl. 90—13)

(Granted under Title 35, U. S. Code (1952), sec. 266)

The invention described herein may be manufactured and used by or for the Government of the United States of America for governmental purposes without the payment of any royalties thereon or therefor.

The present invention concerns a tracer guide and in particular concerns a universal tracer guide forming an attachment for a die-sinking machine.

Two methods have been used in the past to make a die in a die-sinking machine having a tracer head and a cutter head. One method is by using a hand-made full size wood model whereby the tracer head follows the model and controls the cutter head to identical measurements. The second method is by using a thin template, for example a one-eighth inch template, representing a cross section contour of the desired die. However, this requires a separate template for each one-eighth inch of the long axis of die.

It is recognized in the trade that two problems are presented. The first problem involves the high cost of a hand-made full scale wood model. The second problem relates to the number or cost of thin or one-eighth inch templates necessary and the setting up time for each template. Such a set up consists of unlocking the machine on the left side, changing the template, adjusting the cutter radius to a new template on the right side of the machine, relocking the machine on the left side, and test-checking the set up.

The present invention overcomes these difficulties by providing an attachment for a conventional die-sinking machine such as a Cincinnati milling machine whereby die-sinking can be accomplished by use of a single thin template instead of by either a solid model or a series of thin templates.

An object of the invention is to provide a tracer guide.

Another object is to provide a tracer guide for guiding the follower or tracer head on a die-sinking machine.

Another object is to provide an attachment for a milling machine whereby die-sinking can be accomplished by use of a single thin template.

Other objects and many of the attendant advantages of this invention will be readily appreciated as the same becomes better understood by reference to the following detailed description when considered in connection with the accompanying drawings wherein.

Figure 1:
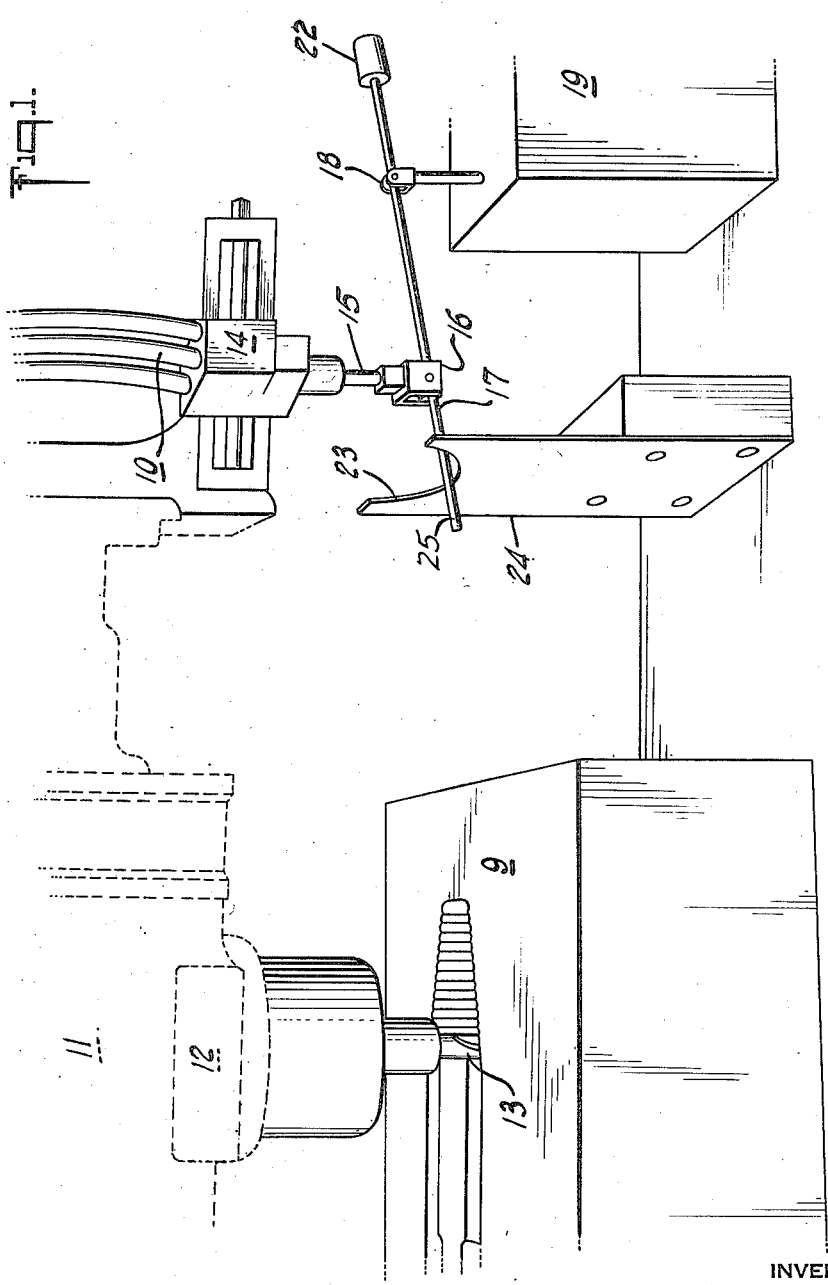
Fig. 1 is a perspective view of the preferred embodiment of the invention.
Figure 2:
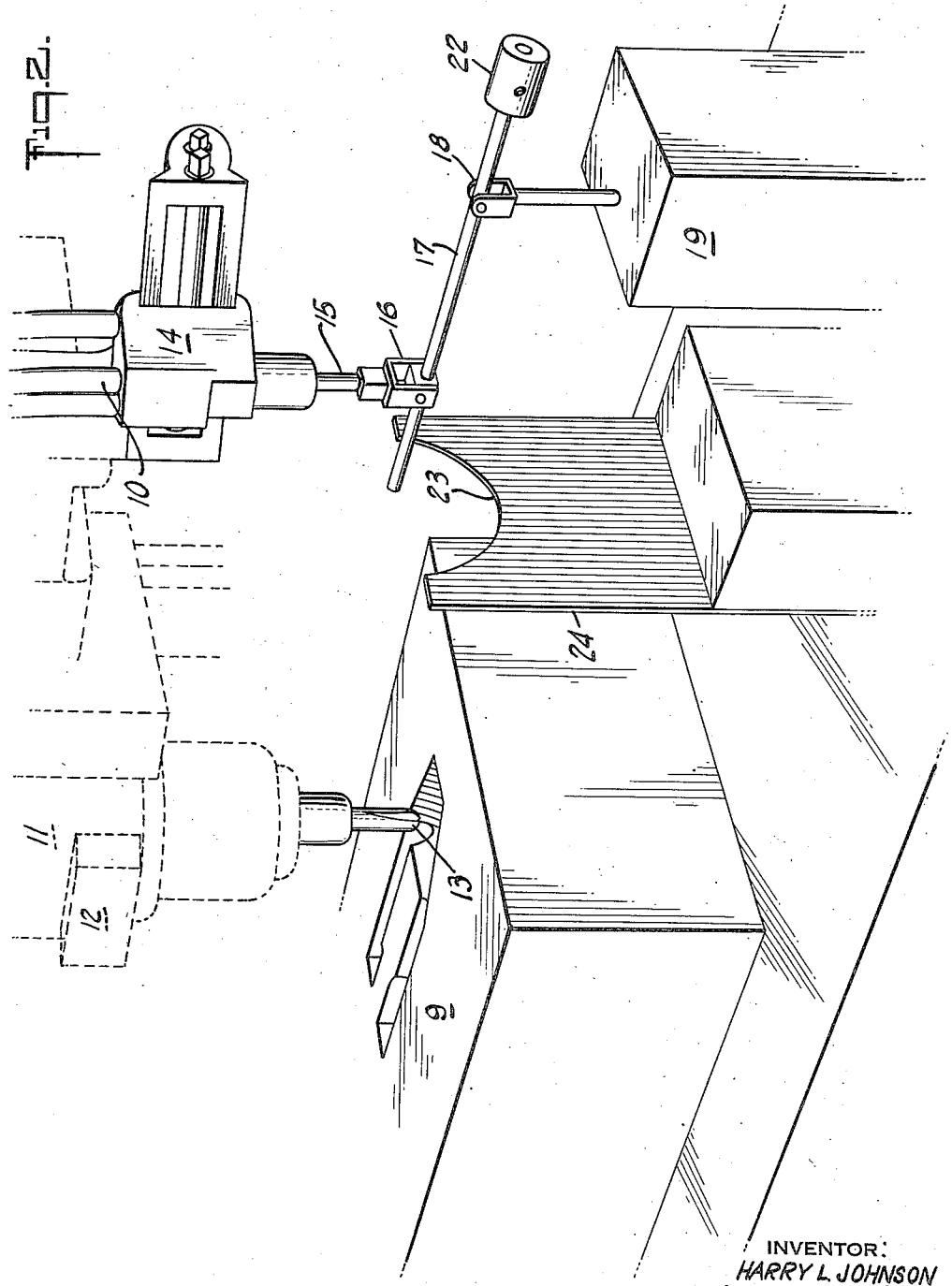
Fig. 2 is a perspective view of the preferred embodiment from the right of Fig. 1.

In the drawing there is shown a die 9 to be cut and a conventional milling machine 11 such as a Cincinnati vertical milling machine. There is provided a cutter head 12 which carries cutter 13. Also provided is a tracer head 14 provided with a depending rod 15 at the lower end of which is mounted a swivel joint 16. Tracer head 14 and cutter head 12 are connected for movement together by a conventional hydraulic transmission system 10 such as a Cincinnati Hydro-tel System.

Swivel joint 16 is mounted to slide upon a guide rod 17 that is carried at a point intermediate its ends by a fixed fulcrum 18 mounted on a fixed base 19. The rod at one end is provided with a counterweight 22 and at the other end 25 follows the guide surface 23 of a thin template 24.

In operation as cutter head 12 and tracer head 14 move toward or away from the observer viewing Fig. 1, the end 25 of guide rod 17 moving along the semi-circular guide face 23 of template causes swivel joint 16 to describe a semi-circular path and this is transmitted hydraulically by system 10 from tracer head 14 to cutter head 12 which causes cutter 13 to describe a similar semi-circular path. As cutter head 12 and tracer head 14 progress to the right as seen in Fig. 1, swivel joint 16 slides to the right along rod 17. In such location to the right, swivel joint 16 will again describe a semi-circular path in moving toward or away from the observer but it will be a semi-circular path of smaller radius than was first described. By transmission through tracer head 14 and system 10 to cutter head 12 cutter 13 is induced to describe a similar semi-circular path of smaller radius. Therefore, as cutter head 12 and tracer head 14 progress to the right as seen in Fig. 1, cutter 13 will perform a series of semi-circular cuts of diminishing radius as shown in the drawing. In this manner a conical cut will be taken from the die 9 forming the work piece.

Obviously many modifications and variations of the present invention are possible in the light of the above teachings. It is therefore to be understood that within the scope of the appended claims the invention may be practiced otherwise than as specifically described.

I claim:

1. In a pattern controlled machine tool having a cutter head, a cutter carried by said head, a tracer head, and a hydraulic system connecting said heads for corresponding movements along similar paths; the improvement comprising a thin template having a guide surface disposed adajcent said tracer head, a swivel fulcrum spaced from said template and lying in the plane of said tracer head, a guide rod pivoted at one end in said swivel fulcrum and engaging the guide surface of said thin template at its other end and a swivel joint connected by a plunger rod to said tracer head and slidably engaging said guide rod between said swivel fulcrum and the guide surface of said thin template to cause said cutter to accurately follow the moton of said swivel joint as said guide rod traverses the guide surface of said thin template whereby said cutter will produce a series of concentric arcuate cuts which correspond to the concentric arcuate paths travelled by said swivel joint as it is moved along said guide rod.

2. In a pattern controlled machine tool having a cutter head, a cutter carried by said head, a tracer head, and a hydraulic system connecting said heads for corresponding movements along similar paths; the improvement comprising a thin template secured to said machine tool adjacent said tracer head and having an arcuate guide surface, a swivel fulcrum secured to said machine tool and spaced from said template in a direction primarily normal to the plane of said template, a guide rod pivoted in said swivel fulcrum and also engaging the guide surface of said thin template, a swivel joint connected to said tracer head and also slidably engaging said guide rod whereby said cutter describes a path of motion geometrically similar to the path of said swivel joint as said guide rod traverses the guide surface of said thin template and as said swivel joint assumes different positions along said guide rod whereby said cutter is adapted to produce a series of concentric arcuate cuts corresponding to concentric arcuate paths traversed by said swivel joint at spaced points along said guide rod.

3. In a pattern controlled machine tool having a cutter head, a cutter carried by said head, a tracer head, and a hydraulic system connecting said heads for corresponding movements along similar paths; the improvement comprising means secured to said machine tool adjacent said tracer head and having narrow guide surface, at least the portion of said means having the narrow guide surface defining a plane, a swivel fulcrum secured to said machine tool and spaced from said means in a direction primarily normal to the plane of said means, a guide rod pivoted in said swivel fulcrum and also engaging the guide surface of said means, a swivel joint connected to said tracer head and also slidably engaging said guide rod whereby said cutter describes a path of motion geometrically similar to the path of said swivel joint as said guide rod traverses the guide surface of said means and as said swivel joint assumes different positions along said guide rod whereby said cutter is adapted to produce a series of concentric similar cuts corresponding to concentric paths traversed by said swivel joint at spaced points along said guide rod.

References Cited in the file of this patent

UNITED STATES PATENTS

| | | |
|---|---|---|
| 1,798,926 | Black et al. | Mar. 31, 1931 |
| 2,192,267 | Kelley | Mar. 5, 1940 |
| 2,239,625 | Roehm et al. | Apr. 22, 1941 |

FOREIGN PATENTS

| | | |
|---|---|---|
| 861,044 | Germany | Dec. 29, 1952 |